Sept. 16, 1969  I. K. DORTORT  3,467,851
SERIES REACTOR CONSTRUCTION FOR PARALLEL-CONNECTED THYRISTORS
Filed Jan. 20, 1967  3 Sheets-Sheet 1

GRAIN ORIENTATION

INVENTOR
ISADORE K. DORTORT
BY
OSTROLENK, FABER, GERB & SOFFEN
ATTORNEYS

Sept. 16, 1969     I. K. DORTORT     3,467,851
SERIES REACTOR CONSTRUCTION FOR PARALLEL-CONNECTED THYRISTORS
Filed Jan. 20, 1967     3 Sheets-Sheet 2

INVENTOR
ISADORE K. DORTORT
BY OSTROLENK, FABER, GERB & SOFFEN
ATTORNEYS

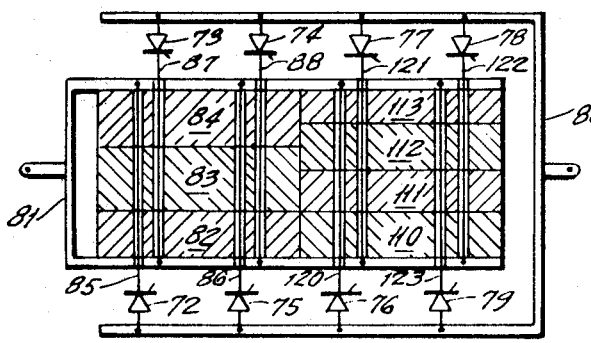

United States Patent Office 3,467,851
Patented Sept. 16, 1969

3,467,851
SERIES REACTOR CONSTRUCTION FOR
PARALLEL-CONNECTED THYRISTORS
Isadore K. Dortort, Philadelphia, Pa., assignor, by mesne assignments, to I-T-E Imperial Corporation, Philadelphia, Pa., a corporation of Delaware
Filed Jan. 20, 1967, Ser. No. 610,635
Int. Cl. H02m 7/00
U.S. Cl. 321—27                                          6 Claims

ABSTRACT OF THE DISCLOSURE

A rate-of-rise-of-current limiting reactor construction for thyristors is formed from a stack of grain-oriented magnetic laminations perpendicular to the current path of a single turn conductor extending through the stack, part of the flux path lying across the direction of orientation to provide the effect of an air-gapped reactor. This type of reactor is incorporated into a stack of punched magnetic laminations which have openings for receiving the conductors of a large number of parallel-connected thyristors such that a portion of the stack magnetically couples adjacent thyristor current paths to one another to balance the current flow through the parallel thyristors, while the second portion of the stack encircles each individual thyristor conductor to form a series reactor for the thyristor conductor.

---

This invention relates to a rate-of-rise-of-current limiting reactor structure for thyristors which includes a reactor in series with the thyristor, which reactor is formed of grain-oriented material designed so that part of the flux path is across the grain to give the effect of an air-gapped reactor, where the reactor may be incorporated into a punched stack of laminations which also effects current balancing between parallel-connected thyristors.

Forced current balancing for parallel-connected thyristors is well known and is commonly achieved by coupling-reactors which magnetically couple the conductors extending from the thyristors to force balanced current flow between the various thyristors. This type arrangement is shown in my U.S. Patent 3,259,831, entitled "Balancing Circuit for Electrically Interconnected Semi-conductor Devices," assigned to the assignee of the present invention.

The current balancing reactors may take the form of punches laminations, as described in U.S. Patent 3,050,634, in the name of Dortort, and assigned to the assignee of the present invention.

Additional problems arise, however, in the operations of parallel-connected thyristors or in the operation of individual thyristors which are not overcome solely by the use of current balancing reactor structures. That is, it is necessary to intentionally limit the rate-of-rise-of-current through a thyristor, as by connecting a series reactor in the thyristor circuit. Rate-of-rise-of-current must be limited since, when a thyristor initially fires, it will conduct current from the control layer to the cathode electrode through a thin filament-shaped, high resistance path. This filament eventually spreads out over the entire cathode junction, and its resistance reduces accordingly until the device is fully conductive over its full surface area. Before this occurs, however, it is necessary to limit the current through the initial filamentary path since, if full available current is permitted to flow immediately within this filamentary path, it can destroy the device by the excessive overheating caused by high current flowing through the relatively high resistance filament. Commonly, reactors are connected in series with the thyristor, which are properly dimensioned to limit the rate-of-rise-of-current through the thyristor after firing to some value below the rate-of-rise-of-current withstand capability of the thyristor device.

The problem of controlling rate-of-rise-of-current through a thyristor is further aggravated where a plurality of thyristors are connected in parallel since the devices cannot be assumed to gate simultaneously so that the first to fire can be expected to take the full available rate-of-rise-of-current from the circuit which will generally be greater than that of a circuit connected to a single thyristor device. For this reason, it is possible that even after parallel-connected thyristors are equipped with series reactors designed according to the design parameters for a single thyristor, the rate-of-rise-of-current through the thyristor first to fire will exceed its rate-of-rise-of-current capabilities because of the low source impedance of a circuit driving a plurality of parallel devices.

Series reactors provided in the past have been formed of a spirally wound longitudinally oriented magnetic steel band. Such devices have very high residual flux density when operated in a unidirectional circuit, as would be the case when they are connected in series with a thyristor, so that their inductance, which is a function of the incremental flux change of the reactor, is limited. Note that incremental flux change will be small in a reactor device having a high residual since the incremental flux change will be, at most, the difference between the saturation flux density and the residual flux density of the reactor. In order to provide a greater incremental flux change in such devices by lowering the residual flux density, it is possible to bias the reactor by providing it with a bias winding and a d-c bias supply. This, of course, increases the expense and complexity of the system. Alternatively, the reactor can be provided with an air gap which will reduce its residual flux density but may decrease the peak flux by a larger amount, thereby decreasing the incremental flux and therefore the inductance. Even a carefully ground butt joint for the reactor air gap will substantially increase the reluctance of the magnetic path to such an extent that a considerable increase in the physical size of the reactor may be required to obtain the needed inductance. Control of very small air gaps is exceedingly difficult.

One important feature of the present invention lies in the construction of a reactor of magnetic laminations which has a relatively small size, but provides the effect of an air gap in order to reduce the residual flux density of the reactor without substantially decreasing the peak flux, thereby increasing the available incremental flux change and thus provide a relatively high inductance.

In accordance with this feature of the invention, the reactor is formed of a stack of magnetic laminations which are each punched from a sheet of oriented steel material. The oriented laminations are then provided with an opening for receiving at least a single straight-through turn extending from a series connected thyristor, whereupon the grain orientation will be perpendicular to the magnetic field generated by the winding in part of the magnetic path. This will then decrease the residual flux density of the reactor without, however, causing the same increase in reluctance of the magnetic path as would occur with even a carefully ground butt air gap. Thus, the reactor will have a higher available incremental flux change to produce the relatively large inductance as compared to a reactor of the same size, but formed of a core oriented parallel to the magnetic field along the entire path, and will be smaller than a reactor of the same inductance which has an air gap therein for increasing the available incremental flux change.

As a further important feature of the invention, this type of reactor may then be incorporated into a stack of punched laminations which serve to magnetically couple adjacent thyristor conductors to balance the current between the thyristors. This additional lamination means would have individual openings therein positioned to receive the individual diode conductors and would provide grain orientation perpendicular for part of the path of the circulating magnetic field about each of the openings. Thus, a novel unitary structure is provided which incorporates the advantages of current balancing between thyristors and limiting the rate-of-rise-of-current through the thyristors in a single lamination package.

Accordingly, a primary object of this invention is to provide a novel rate-of-rise-of-current limiting means for thyristors.

Yet another object of this invention is to provide a novel reactor structure having an increased available incremental flux density without substantially increasing the physical size of the reactor to obtain a given inductance.

Another object of this invention is to provide a rate-of-rise-of-current limiting reactor for a plurality of parallel-connected thyristors.

A still further object of this invention is to provide a novel magnetic reactor structure for a plurality of parallel-connected thyristors which both balances the current through the parallel-connected thyristors, and limits the rate-of-rise-of-current in any of the thyristors.

These and other objects of this invention will become apparent from the following description when taken in connection with the drawings, in which:

FIGURE 1 schematically illustrates a series reactor for limiting the rate-of-rise-of-current in a thyristor.

FIGURE 3 illustrates the flux-current characteristics of the reactor of FIGURES 2 and 2a.

FIGURE 7 is a circuit diagram illustrating four parallel-connected thyristor devices in combination with current balancing reactors for balancing the currents between the four thyristor paths and in further combination with series reactors for limiting the rate-of-rise-of-current through the thyristors, which series reactors can be constructed as illustrated in FIGURES 6 and 6a.

FIGURE 9 illustrates an arrangement in which single lamination packages can be formed to serve both the current balancing function and rate-of-rise-of-current limiting function required in the circuit of FIGURE 7 for an arrangement of eight parallel-connected thyristors.

FIGURES 9a through 9g illustrate the configuration of punched openings in the lamination packages of FIGURE 9.

Figure 10:
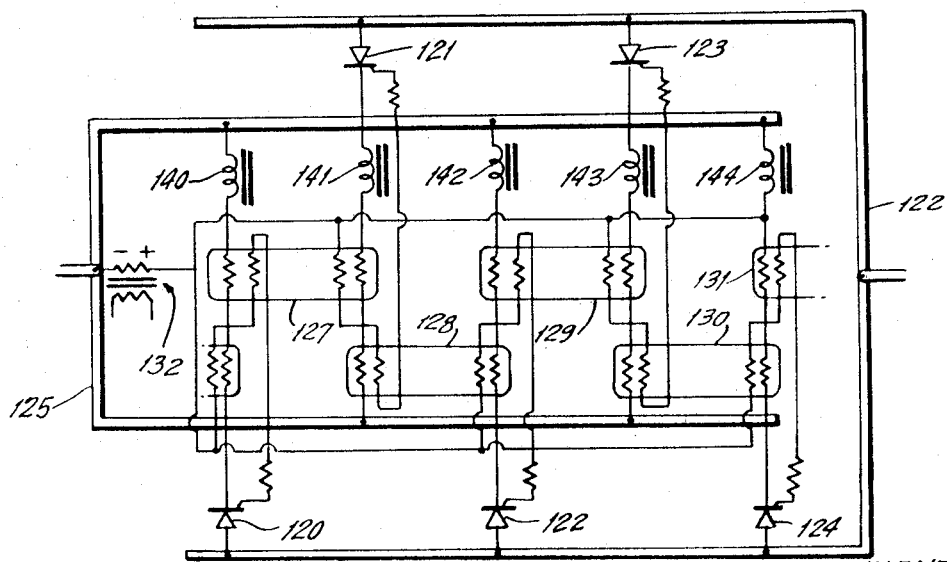

FIGURE 10 schematically illustrates the manner in which the invention can be applied to further incorporate forced balancing of the firing pulses applied to the gates of the various thyristors.

Figure 1:
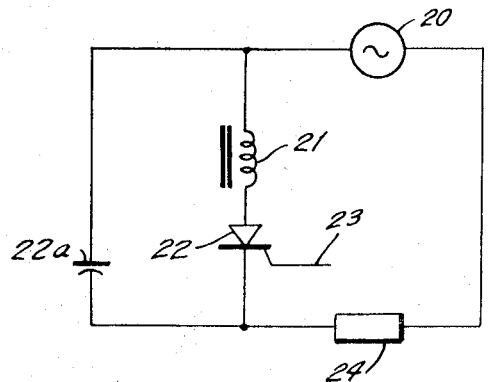

Referring now to FIGURE 1, there is schematically illustrated therein an A-C voltage source 20 connected in series with a reactor 21, the anode and cathode terminals of a thyristor 22 which has a control electrode 23 and some suitable load 24. A shunt capacitor 22a is provided which would permit high rate-of-rise-of-current in thyristor 22. As pointed out previously, the function of reactor 21 is to supply sufficient inductance in the circuit to hold the rate-of-rise-of-current through thyristor 22, after firing, to below some particular value depending upon the rating of thyristor 22.

Figure 2:
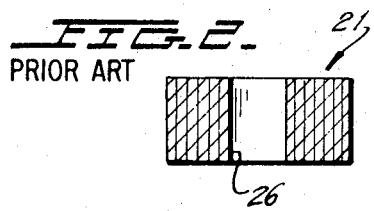
FIGURE 2 is a cross-sectional view of a typical prior art spirally wound reactor used in the circuit of FIGURE 1.
Figure 2A:
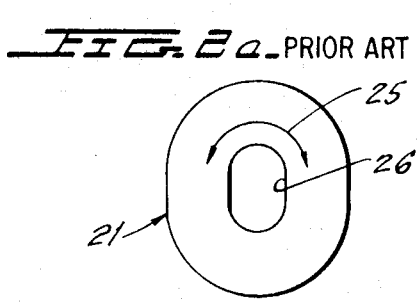
FIGURE 2a is a top view of the reactor of FIGURE 2.
Figure 3:
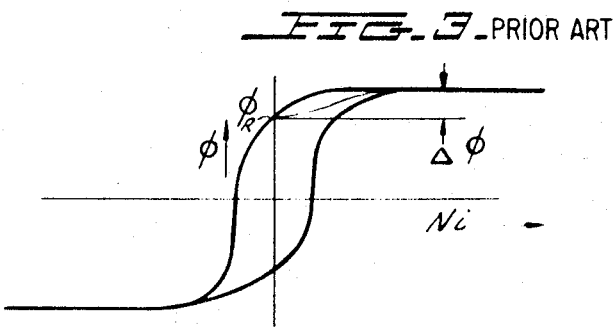

Such reactors are commonly constructed, as illustrated in FIGURES 2 and 3, of a spirally wound strip of oriented steel which is longitudinally grain-oriented. Therefore, magnetic orientation of the reactor of FIGURES 2 and 2a will be circularly around the reactor as indicated by arrow 25. The reactor is then left with a central opening 26 therein which can receive a winding of one or more turns, which is connected between A-C source 20 and thyristor 22 in FIGURE 1. For structural simplicity, this winding is usually simply a straight-through portion of the conductor connected from source 20 to thyristor 22, with the reactor body 21 suitably fixed to this conductor or some other suitable support structure. Reactors constructed in the manner of FIGURES 2 and 2a will have the characteristics illustrated in FIGURE 3 when operated in a unidirectional current circuit of the type shown in FIGURE 1. That is, the grain-oriented steel is selected to obtain the greatest possible flux density. However, the device also has a relatively high residual flux density, illustrated in FIGURE 3 as the flux density $\phi_R$. The total incremental flux change $\Delta\phi$ through which the reactor is driven is then determined by the difference between the saturation flux density and the residual flux density $\phi_R$. The average inductance of the reactor of FIGURES 2 and 2a is proportional to $\Delta\phi/I_{max}$ in a unidirectional pulsating current circuit.

Figure 4:
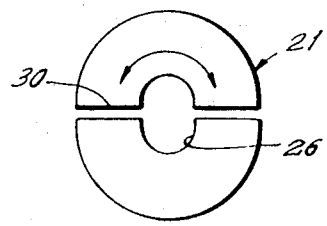
FIGURE 4 illustrates the prior art placement of an air gap in the reactor of FIGURES 2 and 2a in order to avoid saturation.
Figure 5:
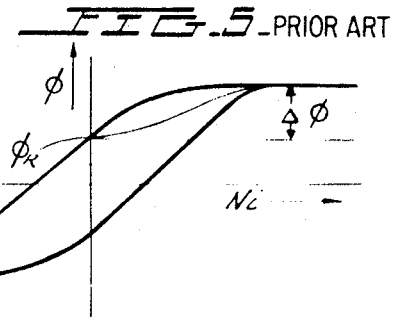
FIGURE 5 is a flux-current characteristic illustrating a theoretically obtainable increased incremental flux density obtained by decreasing the residual flux density with the air gap of the reactor of FIGURE 4.

It is apparent that a decrease in $\phi_R$ would increase $\Delta\phi$ to permit a higher inductance value for the reactor. A D-C bias may be applied to the reactor of FIGURES 2 and 2a to decrease $\phi_R$ where this, however, will obviously increase the complexity of the circuit. Thus, it is common practice to introduce an air gap into the reactor, illustrated in FIGURE 4 by the air gap 30 placed across the reactor 21 of FIGURE 2. The effect of the air gap of FIGURE 4 on the flux-current characteristics of the reactor is illustrated in FIGURE 5, where the air gap decreases the residual flux density and in practical cases, generally decrease $\Delta\phi$. The increased reluctance of the magnetic circuit requires that the physical size of the reactor be increased, either by adding additional turns to the reactor, or by increasing the iron cross-sectional area of the reactor.

Figure 6:
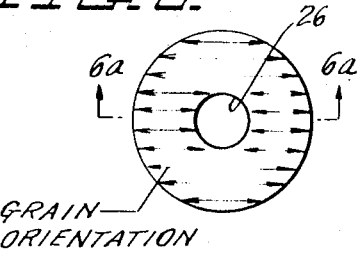
FIGURE 6 is a top view of the reactor construction of the present invention illustrating the direction of orientation of the magnetic laminations.
Figure 6A:
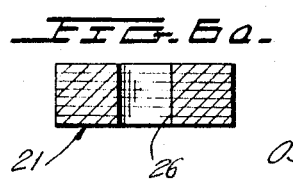
FIGURE 6a is a cross-sectional view of FIGURE 6 taken across the line 6a—6a in FIGURE 6.

In accordance with the invention and as illustrated in FIGURES 6 and 6a, the residual flux density of the reactor is decreased to increase the available incremental flux density without using an air gap and without substantially increasing the reactor size. Thus, in FIGURES 6 and 6a the reactor is formed of a stack of laminations, as illustrated in FIGURE 6a, where the laminations are punched out of oriented steel laminations which are grain oriented in the direction of the arrows of FIGURE 6. Therefore, the magnetic field circulating around the reactor will, for part of its path, be perpendicular to the direction of orientation of the steel. This reduces the residual flux of the reactor with only a modest increase in the reluctance of the magnetic path which, however, would be much smaller than that obtainable with a mechanical air gap no matter how finely ground. Thus, the characteristic of FIGURE 5 of increased available incremental flux density is obtained without substantially increasing the physical size of the reactor. By way of Example, the residual flux density, when using the arrangement of FIGURES 6 and 6a, will fall between 10,000 and 11,000 gauss for a reactor having a saturation flux density of about 17,500 gauss at peak current. It can be shown that when this type of reactor is used with thyristors as the controllable rectifier elements in a bridge-connected 2,000 kilowatt rectifier having an output voltage of 250 volts, 18 thyristors per leg, and with an 8% commutating impedance, the maximum rate-of-rise-of-current, without series reactors of the type described for the present invention, would be approximately 38 amperes per microsecond. With the series reactors of the present invention, however, and having an iron cross-section of 1 square inch and a single straight-through turn, the maximum rate-of-rise-of-current in the first thyristor to fire will be approximately 2 amperes per microsecond in the first microsecond. This is due to the rapid rise of the B–H curve at very small currents. When the same results are to be obtained with reactors of the type shown in FIGURE 4, the physical size of a turn reactor would be larger by at least 15 times, even with .001″ air gaps, because practically all of the reluctance is in the air gaps, and it is linear.

FIGURES 1 through 6 illustrate the present invention for the case of a single reactor to be connected to a single thyristor device.

Figure 7:
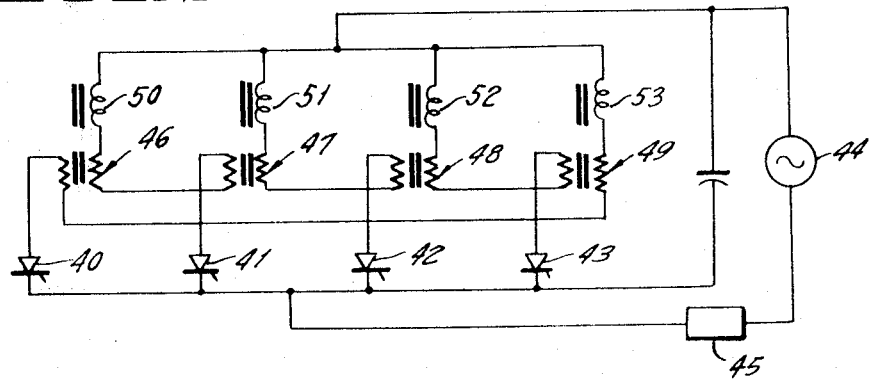

FIGURE 7 illustrates a typical circuit in which four parallel-connected thyristors 40 through 43 are connected between an A-C source 44 and a load 45. Current balancing reactors 46 through 49 are provided in the manner disclosed in my U.S. Patent 2,994,028, entitled "Current Balancing Reactors for Rectifier Elements," and assigned to the assignee of the present invention, whereby the individual conductors in series with thyristors 40 through 43 are magnetically coupled so that the current flowing therethrough during the major portion of the current-carrying interval will be balanced. However, since the thyristors must also be limited in rate-of-rise-of-current, current limiting reactors 50, 51, 52 and 53 are connected in series with thyristors 40 through 43, respectively. Each of the rate-of-rise-of-current limiting reactors 50 through 53 may be constructed individually, as illustrated in FIGURES 6 and 6a.

In accordance with a second feature of the invention, however, each of reactors 50 through 53 may have their reactor cores formed in a common lamination stack having respective openings for the reactor winding or of those portions of the conductors of reactors 50 through 53 which extend through the various openings. This type arrangement is partially illustrated in FIGURE 8 where the stack of laminations 64 is provided with a plurality of openings, such as openings 61 and 62, which would receive conductors defining reactors 51 and 52, respectively, of FIGURE 7. Clearly, additional openings would be provided to the left and right of openings 61 and 62 for receiving the windings or conductors forming the reactors 50 and 53, respectively, of FIGURE 7. Note that in FIGURE 8 the magnetic laminations are grain-oriented in the direction shown by arrows 65 so that the flux of the individual conductors forming the various reactors will necessarily be cross-grain flux for half of its circulation path, thereby to obtain the advantages described in connection with FIGURES 6 and 6a. It should be further noted that the inductance of devices 50 through 53 may provide the desired rate-of-rise-of-current limiting action as well as to provide a sufficiently high impedance for each thyristor to eliminate the need for other current balancing circuits.

Figure 8:
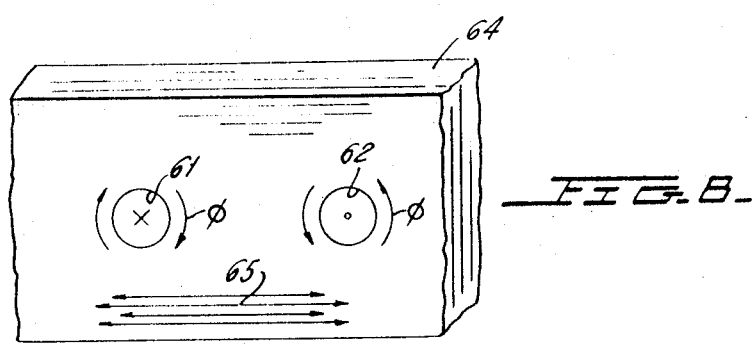
FIGURE 8 illustrates the common lamination package of magnetically oriented laminations which could be used in FIGURE 6 to serve as the rate-of-rise-of-current limiting reactor structure for each of the thyristors of FIGURE 7.

FIGURE 9 illustrates a rectifier circuit in which the lamination-type arrangement of FIGURE 8 can be used in conjunction with laminations for purposes of balancing the current between the parallel thyristors in the manner generally described in U.S. Patent 3,050,634, assigned to the assignee of the present invention.

Referring now to FIGURE 9, there is illustrated one leg of an A-C bridge which includes eight parallel-connected thyristors 72 through 79. The thyristors are connected in parallel between two bus bars 80 and 81 where the bus bar 81 further serves as the support for the laminations which define both current balancing reactors and the rate-of-rise-of-current limiting reactors. In one embodiment of the lamination stack arrangement which is illustrated for thyristors 72 through 75, three packages of laminations 82, 83 and 84 are provided. The laminations are punched for 8 thyristors, although only 4 are shown in the schematic diagram. Thyristors 72 and 75 have their anodes connected to the lower leg of bus 80 and have conductors 85 and 86, respectively, extending through aligned openings in stacks 82 through 84 and terminate electrically on the upper leg of bus 81. The remaining thyristors are similarly connected. In a similar manner, thyristors 73 and 74 have their anodes connected to the upper leg of bus 80 and have conductors 87 and 88 extending therefrom through aligned openings in lamination packages 82 through 84 and terminate on the lower leg of bus 81. The punched configuration of laminations 84 is illustrated in FIGURE 9a wherein slots 90, 91, 92 and 93 are punched in the lamination. Conductors 87 and 86 extend through the opposite corners of opening 90 while conductors 85 and 88 extend through the opposite corners of opening 92. It will be noted that the crosses and dots have been used according to the standard convention to illustrate current flow into and out of the plane of the drawing.

A similar disposition would be provided for the conductors extending from thyristors 76 through 79 with the packages 82 through 84 being long enough and to cooperate with the slots 91 and 93.

The package of laminations 83 will then have the configuration illustrated in FIGURE 9b with vertical slots 94 and 95 and horizontal slots 96 and 97. Conductors 87 and 85, which are straight-through conductors, extend along the upper and lower corners of slots 94, while conductors 86 and 88 pass through the left corners of slots 96 and 97, respectively. Note that the lamination packages are long enough to cooperate with the conductors of thyristors 76 through 79 so that these conductors are received in the right-hand corners of slots 96 and 97 and in the upper and lower corners of slot 95.

The two packages 83 and 84 then comprise the current balancing reactors for achieving a balancing current flow in the current through thyristors 72 through 79 and function in the manner of reactors 46 through 49 of FIGURE 7.

The third package of laminations, however, is provided such as the package 82 in FIGURE 9 which is composed of laminations of oriented grain steel having the configuration shown in FIGURE 9c. Thus, package 82 will have eight openings therein, with the conductors 85 through 88 passing through punched openings 100, 101, 102 and 103, respectively and similarly for the other 4. This will then provide the effect of the rate-of-rise-of-current limiting reactors for thyristors 72 through 75 in the manner illustrated in FIGURE 7 for the case of reactors 50 through 53. Thus, the total package of laminations 82, 83 and 84 can be formed in a unitary structure to obtain the benefits of both current balancing and rate-of-rise-of-current limiting when using the reactors constructed in accordance with FIGURES 9, 9a, 9b and 9c.

An alternate lamination configuration can be used, as illustrated for thyristors 76 through 79 with the configuration of laminations consisting of 113, 112, 111 and 110 each being shown respectively in FIGURES 9d through 9g. It will be apparent that the conductors 120, 121, 122 and 123 of thyristors 76 through 79 would pass through the lamination openings, as illustrated in FIGURES 9d, 9e and 9f in order to obtain the desired current balancing operation, while they would continue to extend through lamination package 110 which is composed of the grain-oriented material similar to the package of FIGURES 8 and 9c to obtain limitation on the rate-of-rise-of-current. It will be apparent that the laminations 110 through 113 will also receive conductors 85 through 88 in the left openings thereof with these laminations used for balancing all of the eight parallel-connected thyristors.

FIGURE 10 illustrates the manner in which the rate-of-rise-of-current limiting reactors can be incorporated in combination with an arrangement similar to that illustrated in U.S. Patent 3,259,831, assigned to the assignee of the present invention, wherein the gating circuits of the thyristors are threaded through the current balancing reactors.

Referring now to FIGURE 10, there is illustrated five parallel-connected thyristors 120 through 124 of a larger group of thyristors connected between buses 125 and 126 which incorporate the schematically illustrated current balancing reactor means 127, 128, 129, 130 and 131 which effect current balancing between the thyristors 120 through 124 along with any other parallel thyristors which may be provided in the circuit. Each of the thyristors 120 through 124 are provided with gate firing circuits which are each additionally threaded through current balancing reactors 127 through 131 in the manner described in U.S. Patent 3,259,831 with a suitable firing pulse source being obtained from pulse transformer 132. Note that other conventional circuits means could be provided with the gating circuits such as the usual Zener diodes for clipping gate voltage and the like with the firing circuit being illustrated in FIGURE 10 in simplified manner. In accordance with the invention, rate-of-rise-of-current limiting reactors 140 through 144 are provided in series with thyristors 120 through 124 and may be constructed in any of the manners illustrated in FIGURES 6 and 6a, FIGURE 8, or FIGURE 9.

The embodiments of the invention in which an exclusive privilege or property is claimed are defined as follows:

1. In combination; a thyristor having an anode, cathode and gate terminals; a source of voltage, a load, and a reactor having a magnetic core, and a single one-turn winding for said magnetic core; said anode and cathode terminals, said source of voltage, said load and said reactor winding connected in a closed series circuit; the rate-of-rise-of-current of said circuit in the absence of said reactor when said thyristor is fired being higher than a safe rate-of-rise-of-current for said thyristor; said reactor having an inductance for reducing the rate-of-rise-of-current through said thyristor to at least said safe rate-of-rise-of-current for said thyristor; the improvement which comprises a construction for said reactor core to decrease its residual flux density thereby to increase the reactor inductance without substantially increasing the physical size or reluctance of said reactor; said reactor core comprising a stack of relatively thin, continuous, large area magnetic laminations having aligned circular openings for receiving said winding axially through said aligned openings; said laminations being grain-oriented in one direction extending along the length of said laminations, whereby the magnetic flux circulating around the axis of said core flows across the direction of grain orientation for a portion of its circular path, thereby to decrease the residual flux density of said core from the value obtained for a core grain-oriented only in the direction of flux flow and only slightly increasing the reluctance of said core.

2. An electrical reactor for connection in a circuit conducting a pulsating current; said reactor comprising a magnetic core and a single one-turn winding on said magnetic core; the improvement which comprises a construction for said reactor core to decrease its residual flux density thereby to increase the reactor inductance without substantially increasing the physical size of said reactor; said reactor core comprising a stack of relatively thin, large area magnetic laminations having aligned circular central openings for receiving said winding axially through said aligned openings; said laminations being each grain-oriented in one direction extending along the length of said laminations and substantially perpendicular to the axis of said aligned openings, whereby the magnetic flux circulating around the axis of said core flows across the direction of grain orientation for a portion of its circulating path, thereby to decrease the residual flux density of said core from the value obtained for a core grain-oriented only in the direction of flux flow and only slightly increasing the reluctance of said core.

3. In combination; a plurality of parallel-connected thyristors, each having anode, cathode and gate terminals, a source of voltage, a load and a plurality of reactors respectively connected in series with said plurality of parallel-connected thyristors; each of said reactors having a magnetic core and a winding for said magnetic core; said source of voltage and said load connected in series with each of said series-connected thyristors and reactors; each of said reactors having an inductance for reducing the rate-of-rise-of-current through its said respective series-connected thyristor; the improvement which comprises a construction for each said reactor core to decrease its residual flux density thereby to increase the reactor inductance without substantially increasing the physical size of said reactor; each said reactor core comprising a stack of relatively thin, large area magnetic laminations having aligned circular openings for receiving said winding axially through said aligned central openings; said laminations being each grain-oriented in one direction extending along the width of said laminations and substantially perpendicular to the axis of said aligned openings, whereby the magnetic flux circulating around the axis of said core flows across the direction of grain orientation for a portion of its circulating path, thereby to decrease the residual flux density of said core from the value obtained for a core grain-oriented only in the direction of flux flow and only slightly increasing the reluctance of said core; and a stack of elongated sheets of grain-oriented steel having a plurality of spaced openings therethrough for forming said cores of said reactors; said windings comprising straight conductors for each of said reactors which extend straight through respective openings of said plurality of spaced openings in said stack of elongated sheets.

4. The combination as set forth in claim 3 which further includes current balancing reactor means connected to each of said thyristors for balancing current flow through said thyristors.

5. The combination as set forth in claim 4 wherein said current balancing reactor means for each of said thyristors comprises a second stack of magnetic laminations having aligned openings therein; each of said thyristors having an extending winding passing through said aligned openings in said second stack.

6. The combination as set forth in claim 5 wherein said first and second stack are respectively stacked with one another.

References Cited

UNITED STATES PATENTS

| | | | |
|---|---|---|---|
| 2,302,571 | 11/1942 | Ray | 336—218 |
| 2,489,977 | 11/1949 | Porter | 336—218 X |
| 2,994,028 | 7/1961 | Dortort | 321—27 |
| 3,042,849 | 7/1962 | Dortort | 321—27 |
| 3,050,634 | 8/1962 | Dortort | 307—58 |
| 3,259,831 | 7/1966 | Dortort | 321—16 |

JOHN F. COUCH, Primary Examiner

G. GOLDBERG, Assistant Examiner

U.S. Cl. X.R.

336—218